US010762068B2

(12) United States Patent
Legler et al.

(10) Patent No.: US 10,762,068 B2
(45) Date of Patent: Sep. 1, 2020

(54) VIRTUAL COLUMNS TO EXPOSE ROW SPECIFIC DETAILS FOR QUERY EXECUTION IN COLUMN STORE DATABASES

(71) Applicant: SAP SE, Walldorf (DE)

(72) Inventors: Thomas Legler, Walldorf (DE); Andreas Tonder, Weinheim (DE)

(73) Assignee: SAP SE, Walldorf (DE)

( * ) Notice: Subject to any disclaimer, the term of this patent is extended or adjusted under 35 U.S.C. 154(b) by 393 days.

(21) Appl. No.: 15/945,723

(22) Filed: Apr. 4, 2018

(65) Prior Publication Data
US 2019/0311051 A1 Oct. 10, 2019

(51) Int. Cl.
G06F 16/00 (2019.01)
G06F 16/22 (2019.01)
G06F 16/25 (2019.01)
G06F 16/2453 (2019.01)

(52) U.S. Cl.
CPC ........ *G06F 16/221* (2019.01); *G06F 16/2255* (2019.01); *G06F 16/2453* (2019.01); *G06F 16/256* (2019.01)

(58) Field of Classification Search
CPC .. G06F 16/221; G06F 16/256; G06F 16/2255; G06F 16/2453; G06F 16/137; G06F 16/325; G06F 16/9014
See application file for complete search history.

(56) References Cited

U.S. PATENT DOCUMENTS

| 5,812,840 | A  | * | 9/1998 | Shwartz ............ G06F 16/2423 |
| 6,938,260 | B1 | * | 8/2005 | Wason .................. G06F 8/24 |
|           |    |   |        | 719/316 |
| 7,966,343 | B2 | * | 6/2011 | Yang .................. G06F 16/221 |
|           |    |   |        | 707/791 |
| 9,430,550 | B2 | * | 8/2016 | Ziauddin ............ G06F 16/283 |
| 10,268,704 | B1 | * | 4/2019 | Sanderson ............ G06F 16/27 |
| 10,275,832 | B1 | * | 4/2019 | Seybold ................ G06Q 40/08 |
| 10,402,383 | B2 | * | 9/2019 | Wenzler .............. G06F 16/245 |
| 10,540,343 | B2 | * | 1/2020 | Colgrove .............. G06F 3/0619 |
| 10,664,470 | B1 | * | 5/2020 | Forghani ............ G06F 16/2255 |
| 2002/0095421 | A1 | * | 7/2002 | Koskas ................ G06F 16/284 |
| 2008/0120321 | A1 | * | 5/2008 | Liu .................. G06F 16/24542 |
| 2011/0137890 | A1 | * | 6/2011 | Bestgen ............ G06F 16/24544 |
|           |    |   |        | 707/719 |
| 2014/0095471 | A1 | * | 4/2014 | Deshmukh ........ G06F 16/24542 |
|           |    |   |        | 707/714 |

(Continued)

*Primary Examiner* — Noosha Arjomandi
(74) *Attorney, Agent, or Firm* — Mintz, Levin, Cohn, Ferris, Glovsky and Popeo, P.C; Pedro Suarez; Paul Brockland

(57) ABSTRACT

A system for implementing virtual columns in a column store database is provided. In some implementations, the system performs operations including accessing a database table in a column store database system, the database table comprising at least one virtual column, the column store database system storing data in a column-oriented structure. The operations further include calculating a value for the at least one virtual column based on at least one existing column of the database table, the calculated value mapped to a row identifier associated with a row of the database table. The operations further include providing, in response to a query, the calculated value to a user interface, the query associated with the row identifier.

18 Claims, 6 Drawing Sheets

(56) References Cited

U.S. PATENT DOCUMENTS

| | | | |
|---|---|---|---|
| 2015/0088856 A1* | 3/2015 | Hunter | G06F 16/24544 707/714 |
| 2015/0088885 A1* | 3/2015 | Hopeman, IV | G06F 16/221 707/737 |
| 2015/0089282 A1* | 3/2015 | Taranta, II | G06F 11/1076 714/6.24 |
| 2015/0121371 A1* | 4/2015 | Gummaraju | G06F 9/45558 718/1 |
| 2016/0267141 A1* | 9/2016 | Leu | G06F 16/24554 |
| 2016/0371795 A1* | 12/2016 | Chrapko | H04L 45/124 |
| 2017/0255709 A1* | 9/2017 | Cho | G06F 16/9024 |
| 2017/0308547 A1* | 10/2017 | Gupta | G06F 16/182 |
| 2018/0113839 A1* | 4/2018 | Li | G06F 7/38 |
| 2018/0150518 A1* | 5/2018 | Merker | G06F 16/24542 |
| 2018/0240020 A1* | 8/2018 | Madaan | G06F 16/2465 |
| 2018/0246809 A1* | 8/2018 | Rebholz | G06F 3/0649 |
| 2018/0268050 A1* | 9/2018 | Kotorov | G06F 16/248 |
| 2018/0300806 A1* | 10/2018 | Wittkotter | G06Q 40/02 |
| 2018/0336263 A1* | 11/2018 | Bensberg | G06F 16/284 |
| 2018/0365290 A1* | 12/2018 | Kaushik | G06F 16/24542 |
| 2019/0057458 A1* | 2/2019 | Chrapko | H04L 45/124 |
| 2019/0102390 A1* | 4/2019 | Antunes | G06F 40/295 |
| 2019/0146972 A1* | 5/2019 | Leu | G06F 16/2365 707/694 |
| 2019/0163678 A1* | 5/2019 | Bath | G06F 16/9535 |
| 2019/0206370 A1* | 7/2019 | Jiang | G09G 5/10 |
| 2019/0220619 A1* | 7/2019 | Loza | G06F 16/2456 |
| 2019/0266163 A1* | 8/2019 | Johnson | G06F 16/248 |
| 2019/0303470 A1* | 10/2019 | Lee | G06F 16/2282 |
| 2019/0311051 A1* | 10/2019 | Legler | G06F 16/2255 |
| 2019/0354620 A1* | 11/2019 | Eluri | G06F 16/2379 |

\* cited by examiner

US 10,762,068 B2

VIRTUAL COLUMNS TO EXPOSE ROW SPECIFIC DETAILS FOR QUERY EXECUTION IN COLUMN STORE DATABASES

TECHNICAL FIELD

The subject matter described herein relates generally to database processing and, more specifically, to query execution and optimizing database performance in column store databases.

BACKGROUND

A database may be configured to store a plurality of electronic data records. The database may be coupled with a database management system (DBMS) that supports a variety of database operations for accessing the data records held in the database including, for example, structured query language (SQL) queries and/or the like. Data may be stored in the DBMS in a column store format in column-oriented storage blocks. Data may also be stored in the DBMS in a row store format in row-oriented storage blocks.

SUMMARY

Systems, methods, and articles of manufacture, including computer program products, are provided for data management. In one aspect, there is provided a system. The system may include at least one data processor and at least one memory. The at least one memory may store instructions that result in operations when executed by the at least one data processor. The operations may include accessing a database table in a column store database system, the database table comprising at least one virtual column, the column store database system storing data in a column-oriented structure. The operations may further include calculating a value for the at least one virtual column based on at least one existing column of the database table, the calculated value mapped to a row identifier associated with a row of the database table. The operations may further include providing, in response to a query, the calculated value to a user interface, the query associated with the row identifier.

In another aspect, there is provided a method. In another aspect, there is provided a method. The method includes accessing a database table in a column store database system, the database table comprising at least one virtual column, the column store database system storing data in a column-oriented structure. The method further includes calculating a value for the at least one virtual column based on at least one existing column of the database table, the calculated value mapped to a row identifier associated with a row of the database table. The method further includes providing, in response to a query, the calculated value to a user interface, the query associated with the row identifier.

In another aspect, there is provided a non-transitory computer program product storing instructions which, when executed by at least one data processor, causes operations which include accessing a database table in a column store database system, the database table comprising at least one virtual column, the column store database system storing data in a column-oriented structure. The operations may further include calculating a value for the at least one virtual column based on at least one existing column of the database table, the calculated value mapped to a row identifier associated with a row of the database table. The operations may further include providing, in response to a query, the calculated value to a user interface, the query associated with the row identifier.

In some variations, one or more features disclosed herein including the following features may optionally be included in any feasible combination. Calculating the value may include retrieving data values from a plurality of columns of the database table, the data values located in a same row of the database table. Calculating the value may further include mapping the row identifier of the same row to the data values from the plurality of columns. Calculating the value may include retrieving metadata of a logical wrapper, the logical wrapper associated with a plurality of columns of the database table, the metadata located in a same row of the database table. Calculating the value may further include mapping the row identifier of the same row to the metadata from the plurality of columns. The calculated value may be based on metadata of a logical wrapper associated with the at least one existing column. The operations may further include receiving the query and optimizing the query based on a partition identifier of a partition of the database table. Optimizing the query may include joining, based on a first partition identifier of the first table and a second partition identifier of the second table, at least a portion of a first table with at least a portion of a second table to form a joined table, the calculated value of the at least one virtual column comprising the first partition identifier and the second partition identifier. The calculated value may include at least one of a creation timestamp, a last locked timestamp, and/or a partition identifier. The calculated value may be provided to the user interface by an application programming interface. The row identifier may include a hash value. The operations may further include receiving the query, the query specifying the at least one virtual column and a threshold timestamp, wherein providing the calculated value to the user interface comprises providing one or more rows of a table associated with a creation timestamp that occurs after the threshold timestamp.

Implementations of the current subject matter may include methods consistent with the descriptions provided herein as well as articles that include a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which may include a non-transitory computer-readable or machine-readable storage medium, may include, encode, store, or the like one or more programs that cause one or more processors to perform one or more of the operations described herein. Computer implemented methods consistent with one or more implementations of the current subject matter may be implemented by one or more data processors residing in a single computing system or multiple computing systems. Such multiple computing systems may be connected and may exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to web application user interfaces, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
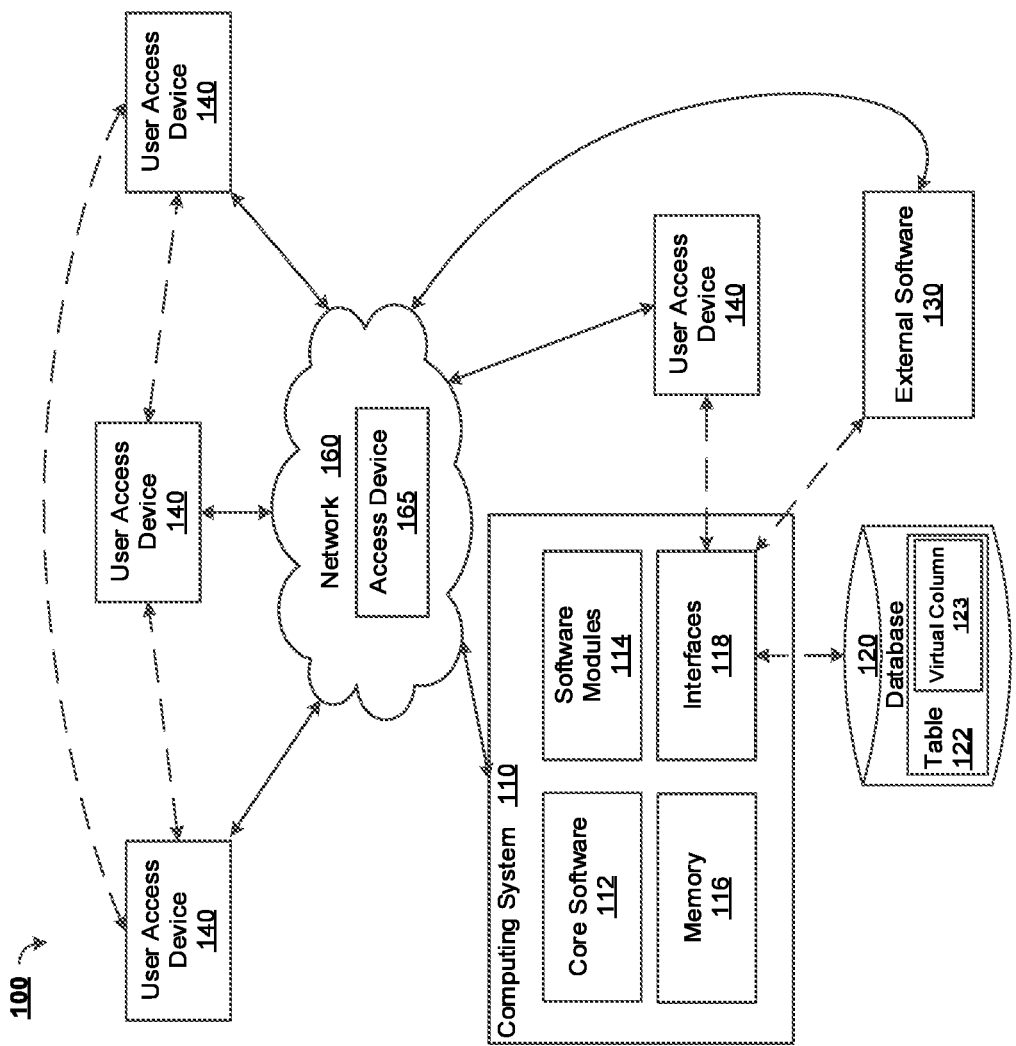
FIG. 1 depicts a functional block diagram of a system in which features consistent with the described subject matter may be implemented.

Database tables are generally stored by column or by row. Column store databases may vertically partition a database into a collection of individual data columns that are stored separately in a column-oriented structure. In a column store database management system (DBMS), adding new columns to a table may be easy and involve low processing. In row store DBMS, data is partitioned into row blocks are stored separately. In a row store DBMS, adding a column to a table may involve increased memory usage and processing. For example, adding the column to a row store DBMS may involve copying a row to a memory block in order to add the column to the copied row. Accordingly, while adding a column to a table in a column store DBMS may not involve much additional processing, adding a column to a table in a row store DBMS may be expensive from a memory and processing standpoint.

A column-oriented DBMS may outperform row-oriented systems on read-intensive tasks, such as business intelligence, customer relationship management, and other data warehousing tasks. Such queries typically involve searching within a subset of the attributes of the database. Because a column-oriented system may accommodate reading only the subset of columns relevant to a given query, read-intensive performance may be improved in a column-oriented system over a row-oriented system, which generally reads entire tuples (i.e. including data of all attributes) into memory.

In the row store DBMS, values correspond to a logical "row" of data, and therefore of different attributes, are stored contiguously within one or more records in physical storage (i.e. in memory, on disk, etc.), followed by records corresponding to other "rows" of data. When accessing or reading data in the row store DBMS, retrieving all data from a single row may be more efficient than retrieving row data from a column store DBMS because the data is located in a single location or row which may minimize disk seeks and processing time. For example, reading an entire row from a column store DBMS table may involve scanning every column of the table in order to read the data values of the row. In some example embodiments, column store DBMS tables may implement a virtual column to expose row specific data for faster reading and/or querying of data in a column store DBMS. Exposing row specific data may beneficially allow a user or processor to filter specific data from the table, find data-specific issues, correct broken tables, and/or the like.

A virtual column may be defined as a table column whose value is automatically calculated using other existing columns values, or another deterministic expression. In some aspects, the virtual column may not store data in physical storage but rather points to physical data of a column and/or to metadata of a logical wrapper. The virtual column may also be queried to retrieve the metadata information from database tables that may not typically be assessable to a user. For example, the virtual column may be able to retrieve operational data, such as creation timestamps, deletion timestamps, lock timestamps, and/or other data. In some aspects, the query results with this metadata may be returned to the user. This typically internal information may enable opportunities for application optimizations or completely new scenarios.

FIG. 1 illustrates a functional block diagram of a system 100 in which features consistent with the described subject matter may be implemented. As illustrated, the system 100 may include a computing system 110 capable of communicating with one or more user access devices 140. In some aspects, the computing system 110 may utilize one or more interfaces 118 for communication. Communication among the devices of the system 100 may be through the use of direct communications, such as through the use of a wireless connection like Bluetooth, near-field communication (NFC), ZigBee, and/or the like, and/or a hard wire connection such as universal serial bus (USB). Communication may additionally or alternatively occur through indirect communications, such as over a network 160 (e.g., a local area network, a wide area network, a wireless network, the Internet, or the like).

Communication over the network 160 may utilize a network access device 165, such as a base station, a Node B, an evolved Node B (eNB), an access nodes (ANs), a hotspot, and/or the like. In some aspects, any of the user access device 140 may include personal computers, desktop computers, laptops, workstations, cell phones, digital media devices, smart phones, smart watches, PDAs (personal digital assistants), tablets, hardware/software servers, sensors, sensor devices, terminals, access terminals (ATs), mobile stations, user equipment (UE), subscriber units, and/or the like.

As illustrated, the computing system 110 may include core software 112 and/or one or more software modules 114. The core software 112 may provide one or more features of a high-level programming software system. The software modules 114 may provide more specialized functionality. For example, the core software 112 and/or software modules 114 may include database management features, such as those described herein.

In some aspects, the core software 112 or other similar software/hardware may be capable of accessing a database layer, such as the database 120, which includes at least one table 122, which may in turn include at least one virtual column 123. The database table 122 may store any kind of data, including transactional data, metadata, timestamp data, lock data, access data, master data, and/or the like.

In some aspects, one or more of the software modules 114 may be configured to utilize data stored in the memory 116, data stored in the database 120, and/or data otherwise accessible to the computing system 110. As further illustrated, the computing system 110 may be capable of utilizing external software 130. In some aspects, the external software 130 may provide additional functionalities or services which may not be available at the computing system 110. In some aspects, the external software 130 may include cloud services. In some aspects, the computing system 110 may aggregate or otherwise provide a gateway via which users may access functionality provided the external software 130. In some implementations, the database 120 and/or the external software 130 may be located across one or more servers, and/or communication among the computing system 110, the database, and/or the external software 130 may occur over the network 160.

At least a portion of the illustrated system 100 may include hardware and/or software that interacts with a database, users, and/or other software applications for defining, creating, and/or updating data, for receiving, handling, optimizing, and/or executing database queries, and/or for running software/applications (e.g., software modules 114, and/or external software 130) which utilize a database. In some aspects, the database 120 may be a structured, organized collection of data, such as schemas, tables, queries, reports, views, and/or the like, which may be processed for information. The database 120 may be physically stored in a hardware server or across a plurality of hardware servers. The database 120 may include a row store database or a column store database. In some aspects, the computing system 110 may be configured to perform OLTP (online transaction processing) and/or OLAP (online analytical processing), which may include complex analytics and tasks. Any of the data stored in the database 120 may additionally or alternatively be stored in the memory 116, which may be required in order to process the data.

In some aspects, the core software 112 may be configured to load the information from the database 120 to memory 116 (e.g., main memory) in response to some event and/or determination. For example, in some aspects, data may be retrieved from the database 120 and/or loaded into the memory 116 based on receipt of a query instantiated by a user or computer system, which may occur through one or more user access device 140, external software 130, and/or the like. In some implementations, at least a portion of the data for the database 120 may reside in-memory (e.g., in random-access memory (RAM)), within the memory 116, for example. In some aspects, data stored in-memory may be accessed faster than data stored in long term storage (also referred to herein as "on disk").

Although the database 120 may be illustrated as described as being separate from the computing system 110, in various implementations, at least a portion of the database 120 may be located within the memory 116 of the computing system 110. Procedures for using virtual columns, such as virtual column 123, to expose row specific details when executing queries in column store databases are described herein.

Figure 2:
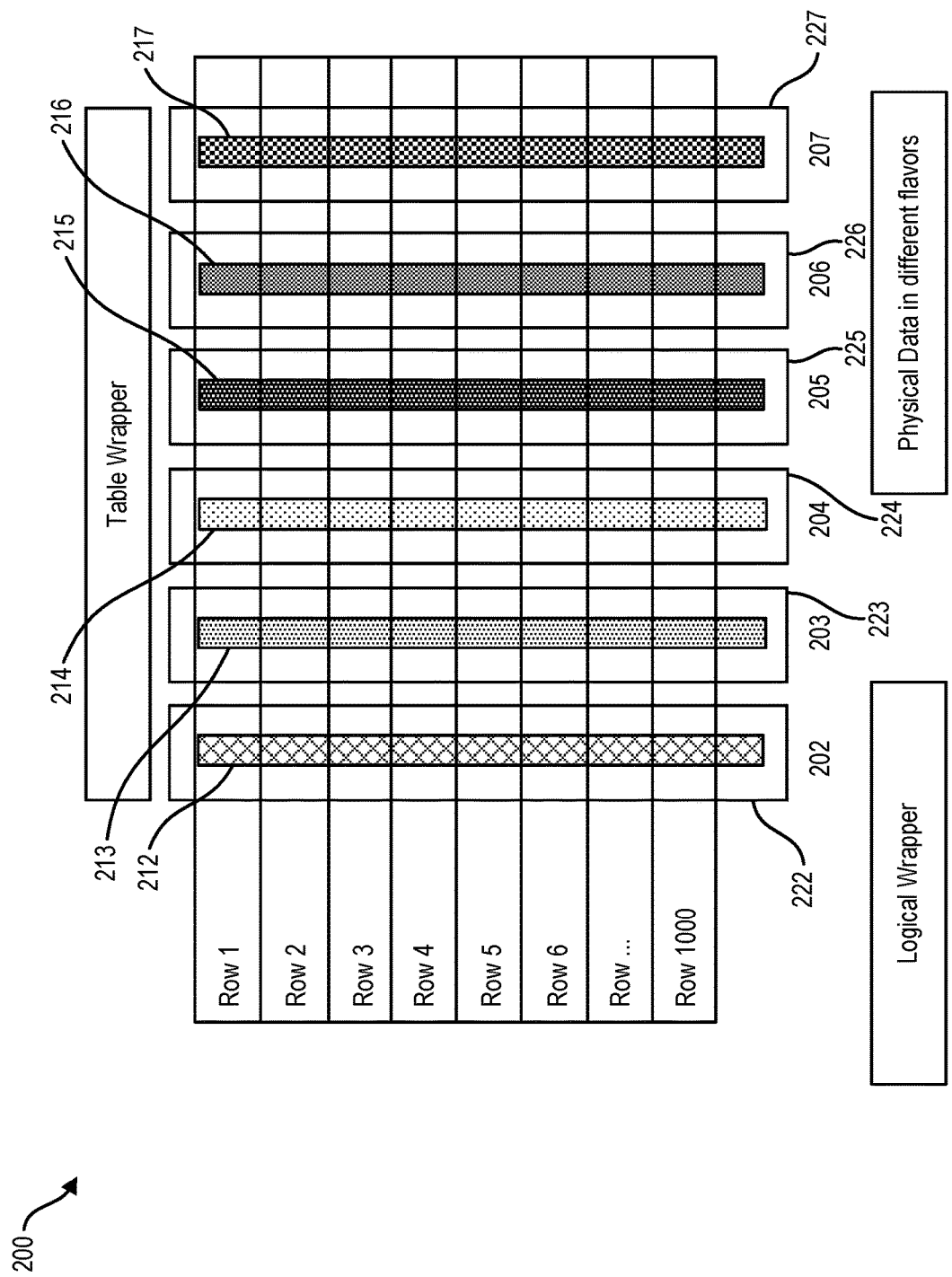
FIG. 2 depicts an example of a column store database table, in accordance with some example implementations.

FIG. 2 depicts an example of a column store database table 200, in accordance with some example implementations. As shown in FIG. 2, the database table 200 includes rows 1-1000 and columns 202-207 storing physical data 212-217, respectively. The database table 200 further includes logical wrappers 222-227 for the columns 202-207, respectively.

In some aspects, the logical wrappers 222-227 comprise an abstraction layer which wraps around the physical data 212-217 in the columns 202-207. The logical wrappers may include metadata, properties, attributes, and/or the like that defines or specifies what the physical data 212-217 is. For example, the physical data 212 stored in column 202 may be name values and the logical wrapper 222 may specify a data type of the name values, such as integer or string values. The physical data 212-217 may include attributes, values, and/or the like. In some aspects, this data may include names, product identifiers, dates, locations, and/or other types of data.

In some implementations, use of the virtual columns may allow an application program interface (API) to expose and/or enable access to at least a portion of the physical data 212-217 and/or at least a portion of the logical wrappers 222-227 of a given row of the database table 200. In some aspects, the API may be executed by the computing system 110 of FIG. 1 and may be used to query the columns of the database table 200 and provide the query results to a user.

Figure 3:
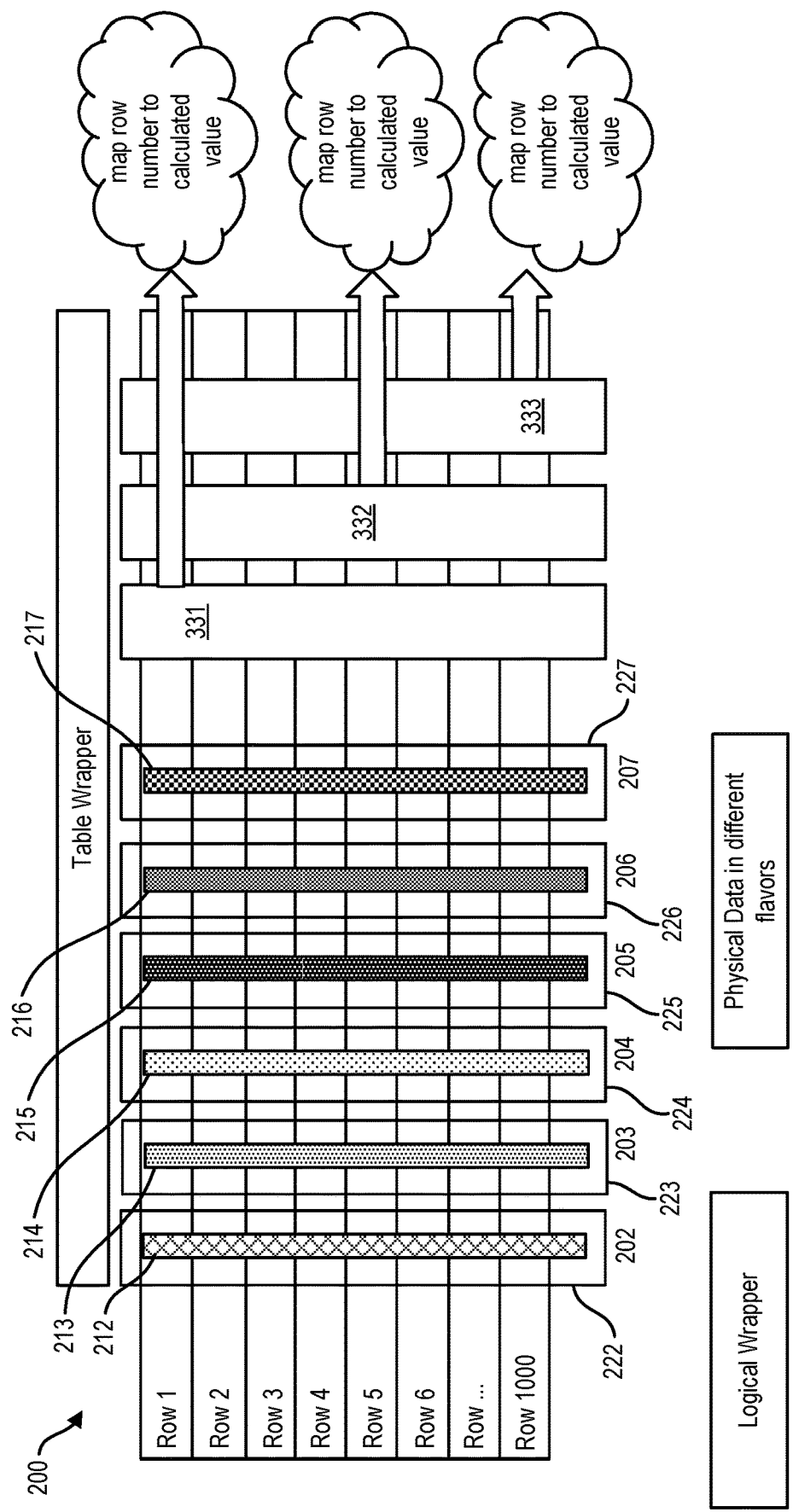
FIG. 3 depicts an example of virtual columns of the column store database table, in accordance with some example implementations.

FIG. 3 depicts an example of virtual columns 331-333 of the column store database table 200, in accordance with some example implementations. As shown in FIG. 3, virtual column 331 may be configured to map a row identifier (ID) of the table 200 to calculated values of the virtual column 331. For example, the virtual column 331 may be configured to reference at least a portion of the physical data 212-217 and/or the logical wrappers 222-227, such as the data of a given row of the database table 200. The virtual column 331 may also be queried to return the calculated values to a user. As shown in FIG. 3, the API may then map the row ID to the calculated value of the virtual column 331.

For example, column 202, 203, and 204 may include data relating to a user's name, address, and telephone number, respectively. In a typical column store database, a user querying for all the contact information for a given person (i.e. row) would require scanning all the contents of columns 202, 203, and 204 to return the name, address, and telephone number for the queried person. In some aspects, virtual column 331 can be configured to return entire row data in response to a query. For example, virtual column 331 can be configured to return the physical data 212, 213, and 214 of Row 1 of FIG. 3. The same mapping and querying may also be applied to virtual columns 332 and 333. For example, virtual columns 332 and 333 may be configured to return the physical data 212, 213, and 214 of Row 2 and Row 3 of FIG. 3, respectively. The virtual columns 331, 332, and 332 may also be configured to return metadata or other operational data of the logical wrappers 222, 223, and 234 of Rows 1, 2, and 3, respectively. While the examples described with respect to FIG. 3 include columns 202, 203, and 204 and Rows 1, 2, and 3, virtual columns, such as virtual columns 331, 332, and 332 may be configured to return data for any row and/or column of table 200. Additionally, more or fewer virtual columns may be added and/or removed to query the table 200.

Figure 4:
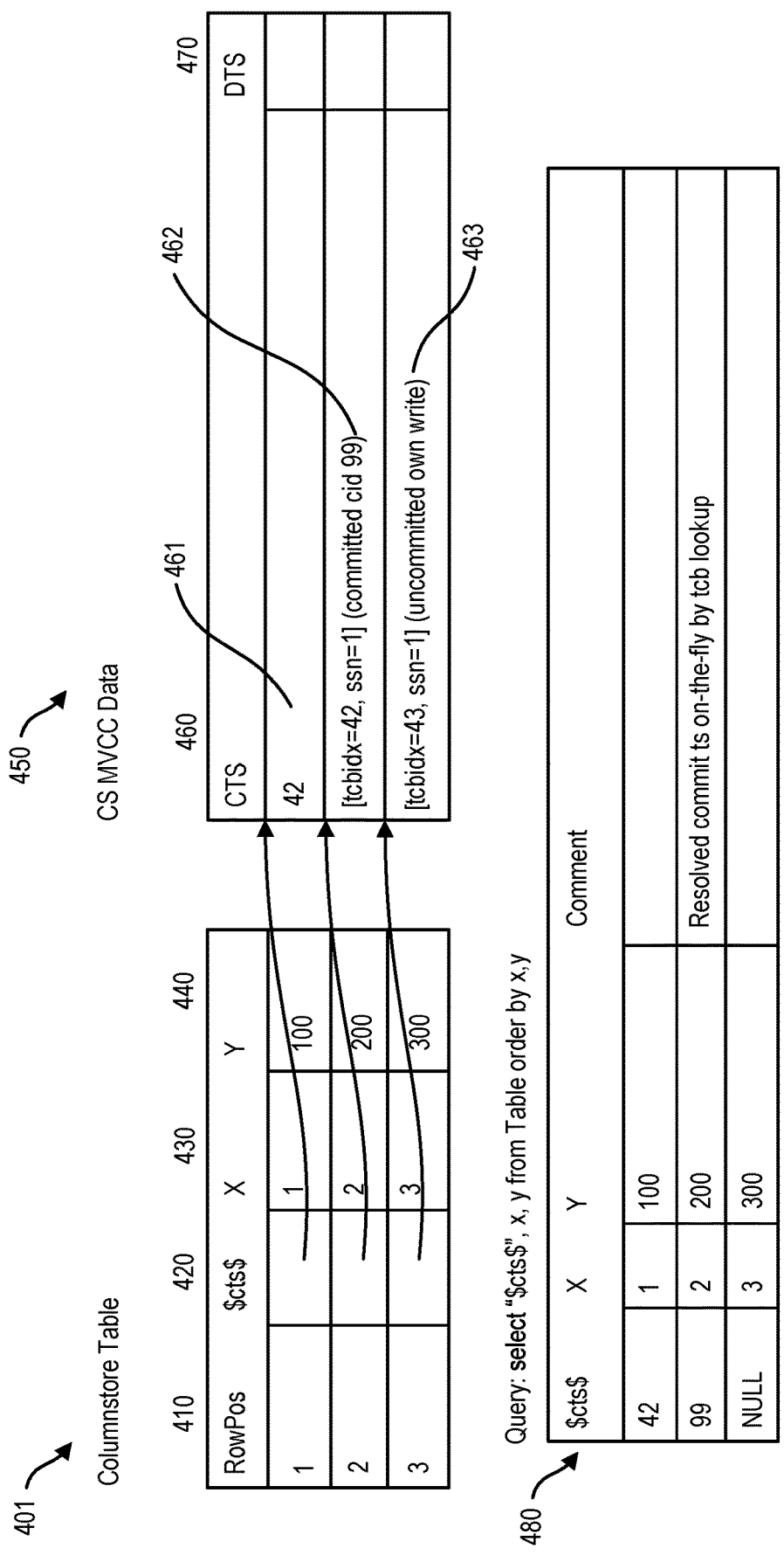
FIG. 4 depicts an example of a virtual column of a table, in accordance with some example implementations.

FIG. 4 depicts an example of using a virtual column 420 of a table 401 to access information of a database table 450, in accordance with some example implementations. As shown in FIG. 4, table 401 includes column 410, column 430, and column 440. In some aspects, column 410 includes row position values, column 430 includes "X" values, and column 440 includes "Y" values. As shown in FIG. 4, the virtual column 420 (labeled "$cts$") points to a multiversion concurrency control (MVCC) creation timestamp (CTS) information of table 450. Table 450 includes column 460 and column 470. Column 460 includes CTS information and column 470 includes deletion timestamp (DTS) information. As further shown in FIG. 4, row 1 of virtual column 420 points to CTS field 461, row 2 of virtual column 420 points to CTS field 462, and row 3 of virtual column 420 points to CTS field 463.

In some aspects, the virtual column 420 may be configured to point to the MVCC CTS data of the corresponding record "commit timestamp (CommitTS) of the insertion of the record." In some implementations, if the record in the table 450 is committed, then the value for the $cts$ virtual column 420 should be the corresponding CommitTS. In some aspects, if the record is committed but the CTS is still a temporary MVCC timestamp, the record may to be resolved to a CommitTS). The temporary MVCC timestamp may include the temporary MVCC timestamp as disclosed in U.S. Pat. No. 9,665,609. If the record is not committed, such as the temporary MVCC timestamp, the value for the $cts$ virtual column 420 should be NULL. As shown in FIG. 4, CTS field 461 has a value of 42, CTS field 462 includes a committed, but temporary, MVCC timestamp which is resolved on-the-fly to a CommitTS value of 99, and the CTS field 463 is an uncommitted timestamp and therefore returns a NULL value to the $cts$ virtual column 420. Table 480 shows the calculated values for the $cts$ virtual column 420 in response to a query "select '$cts$', x, y from Table, order by x,y." In some implementations, the query may be executed by a query processing execution engine of the computing system 110, such as by software modules 114, and/or external software 130.

In some aspects, the use of the virtual columns, such as virtual columns 123, 331-333, and 420, may increase the speed in query results and reduce memory storage because virtual columns may avoid redundant storage of data, such as commit timestamps. Additionally, since virtual columns, such as such as virtual columns 123, 331-333, and 420, do not store any data, they do not take up any physical space. Further, since the virtual columns may be configured to point to other column values or calculate values based on other column values, only the columns involve in the query are calculated and/or scanned which may save on processing time. The virtual columns may also be used for logical row identifiers that could be a hash value or identifier number for every row of a table.

In some aspects, the queries performed on the virtual columns may also return information not previously accessible by a user of the database. Such information may include information identifying a physical placement of data such as: partition identifiers, main/delta, numa location, server identifier, lock timestamp, creation timestamp, and/or the like. Virtual columns may also allow for sophisticated optimizations of databases and database queries such as joins between specific partitions, joins between delta-only data (to separate new data from old data), and/or the like.

Figure 5:
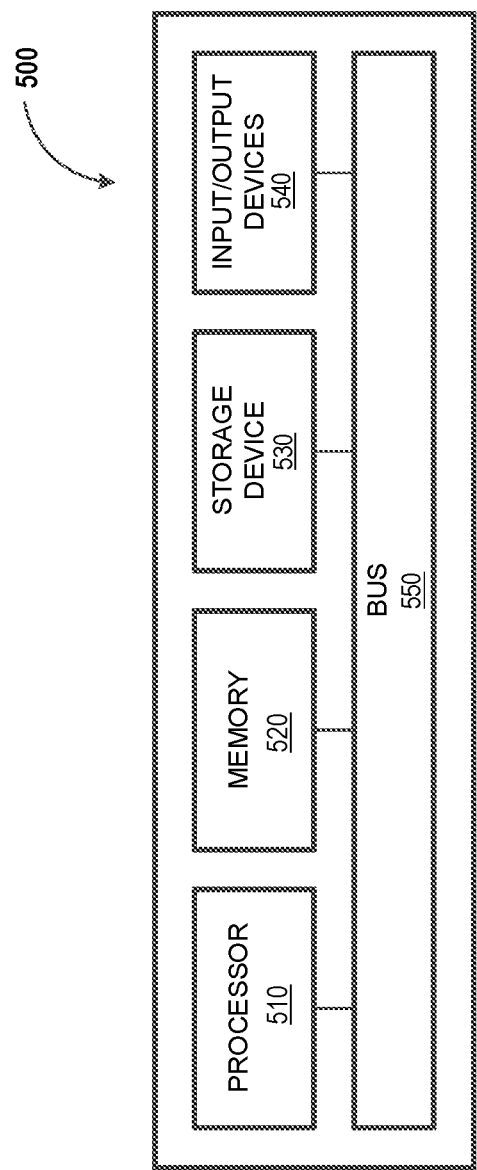
FIG. 5 depicts a block diagram illustrating a computing apparatus, in accordance with some example implementations.

FIG. 5 depicts a block diagram illustrating a computing apparatus 500 consistent with implementations of the current subject matter. Referring to FIGS. 1-3, at least a portion of the computing apparatus 500 may be used to implement at least a portion of the computing device 110, an apparatus providing the database 120, an apparatus providing the external software 130, one or more of the user access devices 140, an access device 165, the process 600 and/or the like.

As shown in FIG. 5, the computing apparatus 500 may include a processor 510, a memory 520, a storage device 530, and input/output devices 540. The processor 510, the memory 520, the storage device 530, and the input/output devices 540 may be interconnected via a system bus 550. The processor 510 is capable of processing instructions for execution that may implement operations consistent with those described herein. Such executed instructions may be implement by one or more components of, for example, the computing device 110, the user access device 140 and/or the access device 165. In some example implementations, the processor 510 may be a single-threaded processor. Alternately, the processor 510 may be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing apparatus 500. The memory 520 may store data structures representing configuration object databases, for example. The storage device 530 is capable of providing persistent storage for the computing apparatus 500. The storage device 530 may be a floppy disk device, a hard disk device, an optical disk device, or a tape device, or other suitable persistent storage means. The input/output device 540 provides input/output operations for the computing apparatus 500. In some example implementations, the input/output device 540 includes a keyboard and/or pointing device. In various implementations, the input/output device 540 includes a display unit for displaying graphical user interfaces.

According to some example implementations, the input/output device 540 may provide input/output operations for a network device. For example, the input/output device 540 may include Ethernet ports or other networking ports to communicate with one or more wired and/or wireless networks (e.g., a local area network (LAN), a wide area network (WAN), the Internet). The input/output device 540 may include one or more antennas for communication over the network 160 with the computing device 110, the user access device 140 and/or the access device 165. Wireless networks may include Wi-Fi, WiMAX, and cellular networks (2G/3G/4G/5G), and/or any other wireless network.

In some example implementations, the computing apparatus 500 may be used to execute various interactive computer software applications that may be used for organization, analysis and/or storage of data in various formats. Alternatively, the computing apparatus 500 may be used to execute any type of software applications. These applications may be used to perform various functionalities, e.g., planning functionalities (e.g., generating, managing, editing of spreadsheet documents, word processing documents, and/or any other objects, etc.), computing functionalities, communications functionalities, etc. The applications may include various add-in functionalities or may be standalone computing products and/or functionalities. Upon activation within the applications, the functionalities may be used to generate the user interface provided via the input/output device 540. The user interface may be generated and presented to a user by the computing apparatus 500 (e.g., on a computer screen monitor, etc.).

Figure 6:
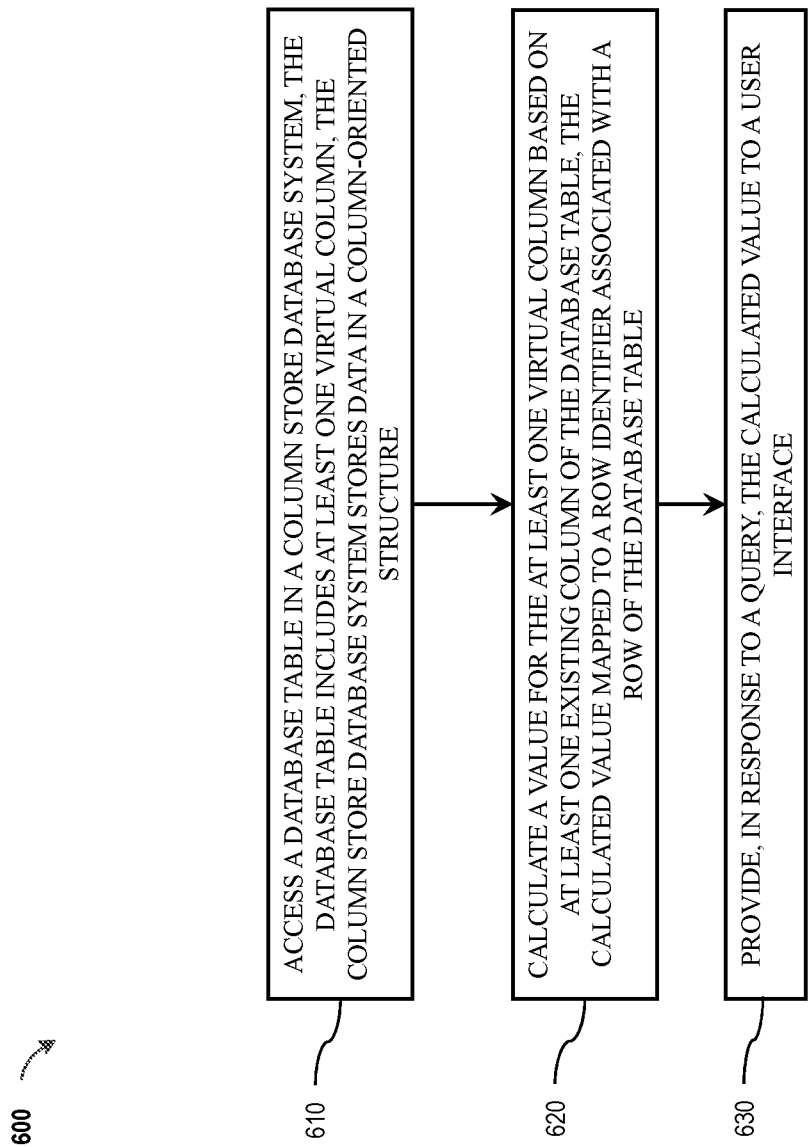
FIG. 6 depicts a flowchart illustrating a process for using virtual columns in a column store database management system, in accordance with some example implementations.

FIG. 6 depicts a flowchart illustrating a process 600 for using virtual columns in a column store database management system, in accordance with some example implementations. Referring to FIGS. 1-5, the process 600 may be performed by a computing apparatus such as, for example, the computing device 110, the user access device 140 and/or the access device 165, and/or the computing apparatus 500.

At operational block 610, the apparatus 500, for example, may access a database table in a column store database system. In some aspects, the database table includes at least one virtual column and the column store database system stores data in a column-oriented structure. At operational block 620, the apparatus 500, for example, may calculate a value for the at least one virtual column based on at least one existing column of the database table. In some implementations, the calculated value is mapped to a row identifier associated with a row of the database table. At operational block 630, the apparatus 500, for example, may provide, in response to a query, the calculated value to a user interface. In some aspects, the query is associated with the row identifier.

One or more aspects or features of the subject matter described herein may be realized in digital electronic circuitry, integrated circuitry, specially designed ASICs, field programmable gate arrays (FPGAs) computer hardware, firmware, software, and/or combinations thereof. These various aspects or features may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which may also be referred to as programs, software, software applications, applications, components, or code, include machine instructions for a programmable processor, and may be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium may store such machine instructions non-transitorily, such as for example as would a non-transient solid-state memory or a magnetic hard drive or any equivalent storage medium. The machine-readable medium may alternatively or additionally store such machine instructions in a transient manner, such as for example, as would a processor cache or other random access memory associated with one or more physical processor cores.

To provide for interaction with a user, one or more aspects or features of the subject matter described herein may be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices may be used to provide for interaction with a user as well. For example, feedback provided to the user may be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein may be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations may be provided in addition to those set forth herein. For example, the implementations described above may be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and
   at least one memory storing instructions which, when executed by the at least one data processor, result in operations comprising:
   accessing a database table in a column store database system, the database table comprising at least one virtual column, the column store database system storing data in a column-oriented structure;
   calculating a value for the at least one virtual column based on at least one existing column of the database table, the calculated value mapped to a row identifier associated with a row of the database table, wherein calculating the value comprises:
   retrieving data values from a plurality of columns of the database table, the data values located in a same row of the database table, and mapping the row identifier of the same row to the data values from the plurality of columns; and providing, in response to a query, the calculated value to a user interface, the query associated with the row identifier.

2. The system of claim 1, wherein calculating the value comprises:
retrieving metadata of a logical wrapper, the logical wrapper associated with a plurality of columns of the database table, the metadata located in a same row of the database table; and
mapping the row identifier of the same row to the metadata from the plurality of columns.

3. The system of claim 1, wherein the calculated value is based on metadata of a logical wrapper associated with the at least one existing column.

4. The system of claim 1, wherein the operations further comprise:
receiving the query; and
optimizing the query based on a partition identifier of a partition of the database table.

5. The system of claim 4, wherein optimizing the query based on the partition identifier comprises joining, based on a first partition identifier of the first table and a second partition identifier of the second table, at least a portion of a first table with at least a portion of a second table to form a joined table, the calculated value of the at least one virtual column comprising the first partition identifier and the second partition identifier.

6. The system of claim 1, wherein the calculated value comprises at least one of a creation timestamp, a last locked timestamp, and/or a partition identifier.

7. The system of claim 1, wherein the providing the calculated value to the user interface comprises providing, by an application programming interface, the calculated value to the user interface.

8. The system of claim 1, wherein the row identifier comprises a hash value.

9. The system of claim 1, wherein the operations further comprise:
receiving the query, the query specifying the at least one virtual column and a threshold timestamp, wherein providing the calculated value to the user interface comprises providing one or more rows of a table associated with a creation timestamp that occurs after the threshold timestamp.

10. A method comprising:
accessing, by at least one processor, a database table in a column store database system, the database table comprising at least one virtual column, the column store database system storing data in a column-oriented structure;
calculating, by the at least one processor, a value for the at least one virtual column based on at least one existing column of the database table, the calculated value mapped to a row identifier associated with a row of the database table, wherein calculating the value comprises:
retrieving data values from a plurality of columns of the database table, the data values located in a same row of the database table, and
mapping the row identifier of the same row to the data values from the plurality of columns; and
providing, by the at least one processor and in response to a query, the calculated value to a user interface, the query associated with the row identifier.

11. The method of claim 10, wherein calculating the value comprises:
retrieving metadata of a logical wrapper, the logical wrapper associated with a plurality of columns of the database table, the metadata located in a same row of the database table; and
mapping the row identifier of the same row to the metadata from the plurality of columns.

12. The method of claim 10, wherein the calculated value is based on metadata of a logical wrapper associated with the at least one existing column.

13. The method of claim 10, further comprising:
receiving the query; and
optimizing the query based on a partition identifier of a partition of the database table.

14. The method of claim 13, wherein optimizing the query based on the partition identifier comprises joining, based on a first partition identifier of the first table and a second partition identifier of the second table, at least a portion of a first table with at least a portion of a second table to form a joined table, the calculated value of the at least one virtual column comprising the first partition identifier and the second partition identifier.

15. The method of claim 10, wherein the calculated value comprises at least one of a creation timestamp, a last locked timestamp, and/or a partition identifier.

16. The method of claim 10, wherein the providing the calculated value to the user interface comprises providing, by an application programming interface, the calculated value to the user interface.

17. The method of claim 10, wherein the row identifier comprises a hash value.

18. A non-transitory computer readable medium storing instructions which, when executed by at least one processor, cause operations comprising:
accessing a database table in a column store database system, the database table comprising at least one virtual column, the column store database system storing data in a column-oriented structure;
calculating a value for the at least one virtual column based on at least one existing column of the database table, the calculated value mapped to a row identifier associated with a row of the database table, wherein calculating the value comprises:
retrieving data values from a plurality of columns of the database table, the data values located in a same row of the database table, and
mapping the row identifier of the same row to the data values from the plurality of columns; and
providing, in response to a query, the calculated value to a user interface, the query associated with the row identifier.

* * * * *